United States Patent Office 3,395,568
Patented Aug. 6, 1968

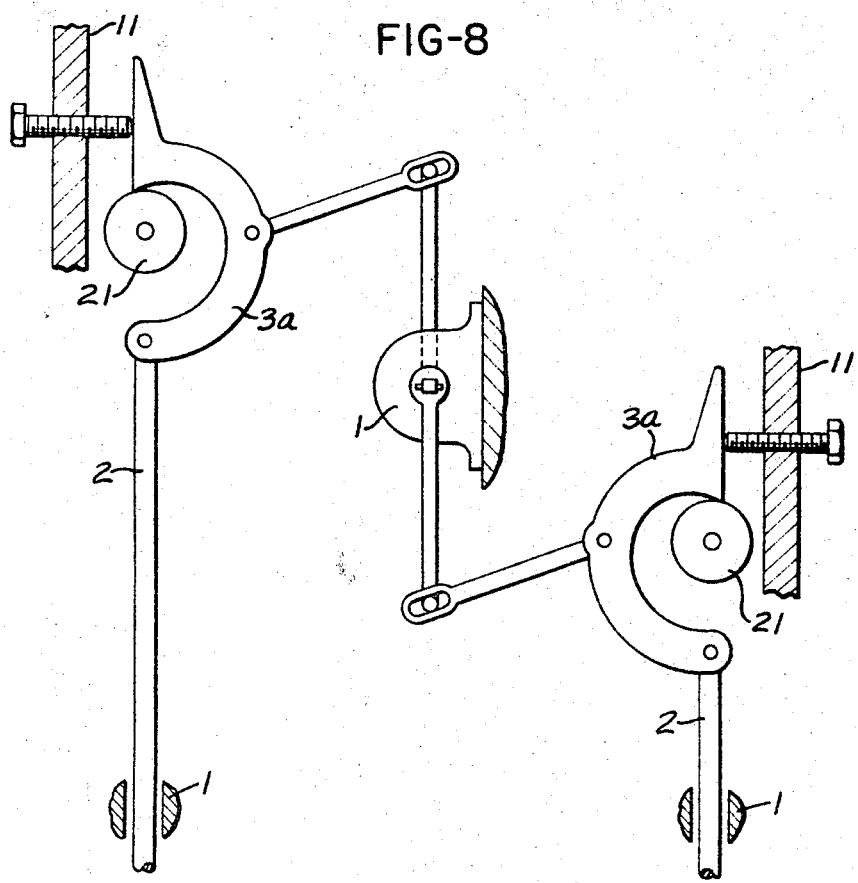
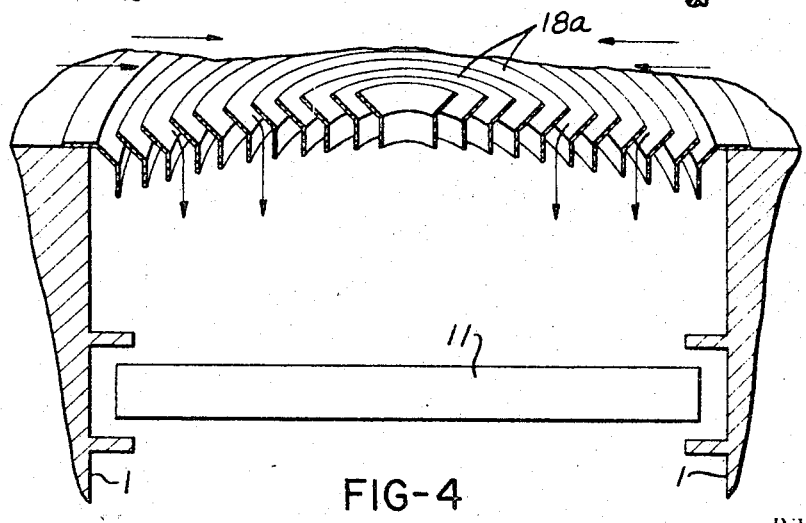

3,395,568
ARRANGEMENT FOR AUTOMATICALLY CLOSING ENERGY PASSAGE SYSTEMS, ESPECIALLY AIR PASSAGES
Alois Lödige, Frankfurter Weg 13, Paderborn, Germany
Filed Aug. 10, 1964, Ser. No. 388,499
Claims priority, application Germany, Aug. 10, 1963,
L 45,580
8 Claims. (Cl. 73—35)

The present invention concerns an apparatus for automatically turning off energy conducting passages, especially air passages.

It is a well known fact that as a result of hurricanes, earthquakes and the like, energy conducting pipelines are damaged and destroyed, and the covers of shut-off valves associated with such pipelines are buried or encumbered by debris so that, for instance the gas or water can continue to flow unimpededly and the electric conductors may still have their full voltage. Such a situation brings about the danger that the continuously escaping gas initiates chain reactions of subsequent explosions, and this danger is all the greater when, in view of a panic caused by the explosion, it is forgotten to close the respective valves and to shut off the electric energy.

In underground mining installations, it usually happens that in view of explosions caused by an explosive mixture of air and inflammable earth gases, the venting installations and compressed air conduits and electric energy carriers are damaged or even destroyed. In such circumstances, it is dangerous, when the gases formed by the explosion ignite and cause widespread fires or when the so-called after-damp or choke-damp, which has a chocking effect due to its content in carbon dioxide and nitrogen, invades the other sections not directly affected by the explosion.

With modern shelter constructions, considerable air pressure and earth shocks occurs as a result of detonations near said shelter of blasting bombs and as a result of the explosion of atomic bombs or other modern weapons. Such air pressure and earth shocks put the rather sensitive shelter alarm instruments and shelter supply instruments out of operation whereby the shelter occupants are subjected to increased dangers inasmuch as, for instance, filtered air is no longer supplied to the shelter while together with the air, combat gases or the like invade the shelter construction.

Devices for automatically shutting off pipelines for gases or liquid media have become known in which the shutting off process is initiated by vibration. Such devices consist primarily of two interconnected parts which roll upon each other during a shock and which, after a certain period of time, buckle or bend so that the spring-urged valve disc will be brought into closing position.

According to another heretofore known device of the type involved, one of the two parts which roll upon each other is titled so that the valve disc is closed by a spring force.

The above-mentioned heretofore known devices, however, have a limited technical field of application because, due to the said rolling process necessary for the initiating steps, these devices have a considerabl inertia.

According to a still further heretofore known device, a ball will as a result of a shock or vibration roll from a position of rest over a path or racing to a spoon and change the position of the latter so that the valve will be closed. Also in this instance, the closing operation causes a time lag in view of the necessary rolling time for the ball.

It is, therefore, an object of the present invention to provide an apparatus for automatically shutting off energy conveying conduit and conductor systems, especially air passages, which will overcome the above-mentioned drawbacks.

It is another object of this invention to provide an apparatus as set forth in the preceding paragraph which will excel by a high degree of safety of operation.

It is still another object of this invention to provide an apparatus as set forth above which will be of simple but strong construction and will be compact and relatively inexpensive to produce.

These and other objects and advantages of the invention will appear more clearly from the following specification in connection with the accompanying drawings, in which:

FIGURE 1 diagrammatically illustrates a side view, partially in section, of an apparatus according to the invention showing the initiating or release elements in its upper dead center position;

FIGURE 4 shows a detail of an apparatus according to the invention.

FIGURE 8 shows two release mechanisms coupled to each other, according to the present invention.

According to the present invention, taking advantage of air pressure waves or suction resulting from shock waves or earthquake waves, a relatively movable body which is particularly heavy with regard to an initiating or release mechanism of a rather reduced mass, is adapted through the intervention of adjustable positive contacting means to release preloaded closing energy. This is made possible without said movable body taking part in the total movement of the releasing means so that the heavy, freely movable mass will at smallest amplitudes of oscillation bring about an extremely fast release prior to the occurrence of the high pressure phase with its destructive inertia energy.

Preferably, the arrangement according tothe present invention consists of a chassis body provided with apertures, and of a body freely movable to all sides in said chassis body. The freely movable body is through the intervention of adjustable pressure members serving as contact means positively connected to a releasing device which in its upper dead center position rests on said chassis body and has its lower end provided with a pulling device comprising an adjusting mechanism and a commonly operable tensioning or preloading device.

According to a particularly advantageous embodiment of the present invention, the freely movable body designed as a pendulum may be preceded on the outside by an air deviating grid, screen or the like which is adapted to be acted upon by a force exerted by an air shock and is secured against harmful influence as, for instance, sabotage.

Figure 1:
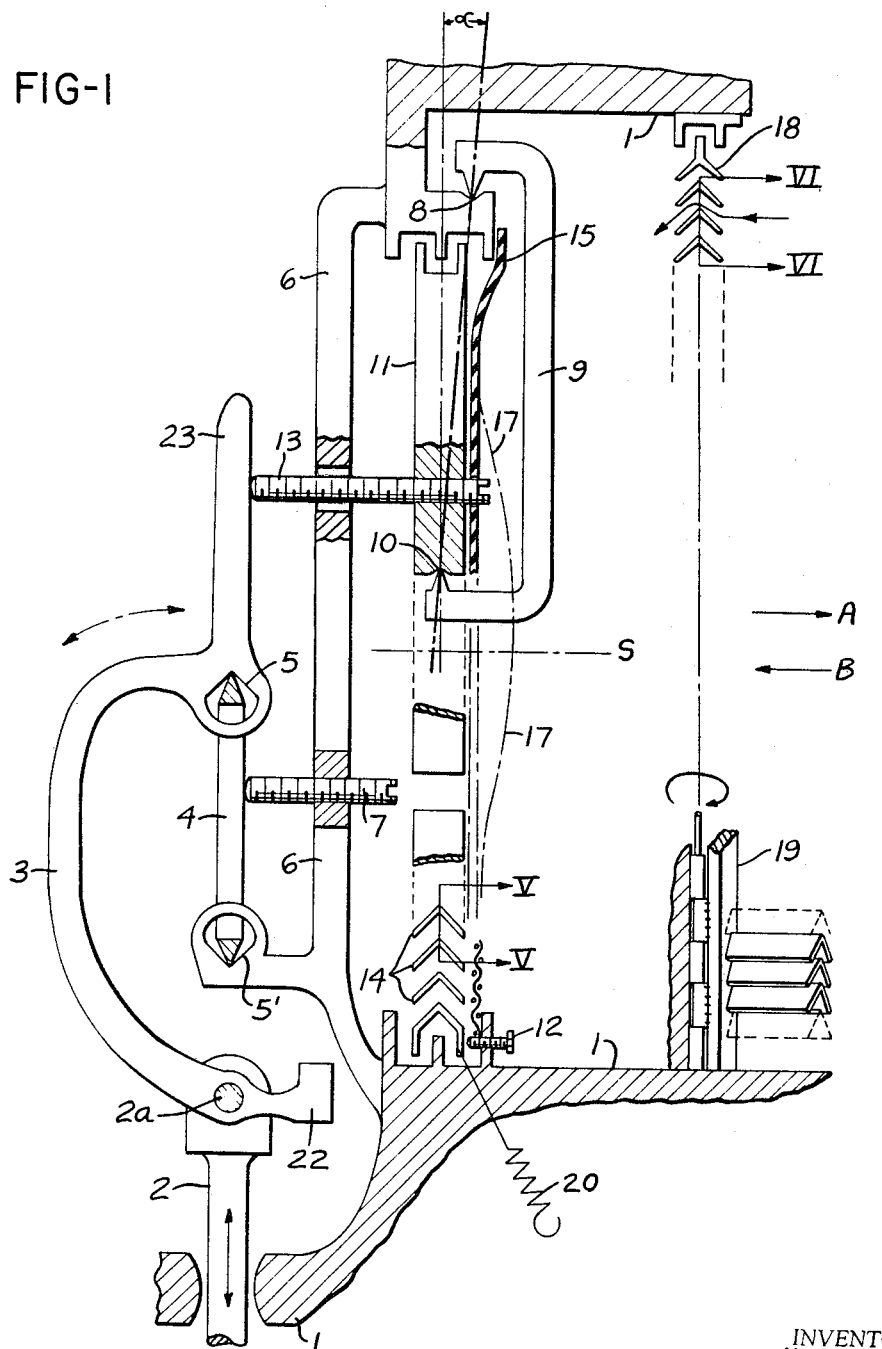

Referring now to the drawing in detail, the arrangement shown in FIG. 1 comprises a housing body 1 in which there is arranged a release or initiating bar 2 having linked thereto at 2a a hooked-shaped release or initiating member 3 which latter is connected to the housing body 1 by means of a supporting element 4. Support element 4 on one hand rests on a knife-edge support 5 in a hook-shaped release member 3, and on the other hand rests on a knife-edge support 5' on a lever arm 6 of the housing body 1. The arrangement furthermore comprises and adjusting screw 7 threadedly passed through arm 6 and adapted to engage supporting element 4 to control the hook effect in its dead center position, which means the sensitivity of the release. Suspended in a knife-edge support 8 of the housing body 1 is a pendulum hook 9 which at its knife-edge 10 carries a pendulum body 11 above the center of gravity S of said pendulum body 11 whereby the latter is suspended for stable pendulum movement. Adjusting screws 12 which may be arranged around the pendulum body 11 press pendulum hook 9 out of its stable pendulum position so that a power flow pendulum component will occur as pressure force factor in the adjusting screws 12.

Pendulum hook 9 is deviated by an angle α. With increasing angle α, the stability increases and thus the sensitivity to shocks, which, however, is not yet intended to bring about the release of the mechanism. The force in the adjusting screws 12 has, for instance to be overcome as air pressure in order to bring about the release of the mechanism. This air pressure force is required, for instance with shelter constructions in order to make sure that the normal venting will not release or initiate the operation of the device.

Connected to the pendulum body 11 is an adjustable pressure member, for instance an adjusting screw 13 which establishes a rigid connection between the pendulum body 11 and the release hook 3 so that the entire system will have no play. Pendulum body 11 is preferably air-permeable and in order to bring about changes in the flow direction is formed, for instance of angle irons, as illustrated in FIG. 4. This coarse air-permeable pendulum body serving as grid or screen may be preceded by an air non-permeable or air-permeable diaphragm 15 in order to prevent the passage of a flame. Instead of a diaphragm 15, there may also be employed a fine-mesh screen 16 fixedly connected to pendulum body 11. In order to cover unavoidable passages in the diaphragm or screen within the adjusting range, a more or less permeable screen 17 with diaphragm effect is arranged above said passages. To protect the fine adjustable mechanism against damage, especially sabotage or other disturbing influences, the release mechanism is preceded by an air deviating grid or member 18.

In order to assure easy accessibility to the adjusting means of the release mechanism, the air deviating member 18 may be tiltable, as shown at 19. It is also possible particularly with a horizontal arrangement of the release mechanism, to design the deviating member in the form of a circularly shaped deviating member 18a, as shown in FIG. 4. Of course, also other designs are possible in this connection to permit an air shock from any direction to bring about a release of the mechanism in view of the said deviation. Depending on the specific requirements, the air impacting upon the air deviating member 18 (FIG. 1) from the side may be deviated at a right angle by a cone 18a as illustrated in FIG. 4 in order that the air then impacts upon a similar release mechanism. Moreover, in order to be independent of the air shock direction, a plurality of release mechanism arranged in different directions may be coupled to each other, however, with such running ahead (Vorlauf) play that the coupling will establish power connection only when the upper dead center position of hook 3 of the device located in air shock direction will have been far exceeded.

The deviating grids or members are intended to equalize the weak air shocks which are not intended to bring about realese of the mechanism.

When employing the arrangement according to the invention for shelter constructions, it is also possible that the short stroke air shock of a small shell or projectile is not intended to bring about a release of the mechanism.

An atomic air shock, which has a long stroke, is however, intended immediately to release operation of the corresponding protective devices. Possibly, by discharging gases of very low inflammability over the natural air path, an underground chamber may be blasted by gases (see FIG. 1) slowly flowing into the chamber through the air deviating grid, the adjacent screens and the venting system. After the underground chamber has been sufficiently filled with gas, the gas could be ignited in front of the air deviating member. Now an explosion would take place in the chamber between the air deviating grid 18 and pendulum body 11, the pressure of such explosion would likewise release protective devices while the release mechanism with or without a power amplifier would, for instance, shut off the valves before the latter are reached by the pressure wave. The release of the mechanism takes place in the following manner:

Assuming that an air shock occurs in the direction of the arrow B (FIG. 1) the air will pass along the air deviating member 18 and will then impact upon the screen diaphragms 16, 17 and subsequently will impact upon the deviating surface of the pendulum body 11. When this occurs, the total shock force from members 16, 17 and 14 will exceed the stabilizing pendulum component so that the pendulum body 11 is lifted off from the adjusting screws 12 and by means of adjusting screw 13 pushes hook 3 beyond its labile dead center point whereby the mechanism is released through the intervention of pull-rod 2. In stances where the pendulum body 11 is arranged horizontally, the gravitational force may, with the same effects, be replaced, for instance by springs 20.

When an earth shock occurs in the direction of the arrow A, housing body 1 will, in the positive phase be moved in the direction of the arrow A by a distance equalling the wave stroke. Since the pendulum body 11 due to its free movability is subject to the intertia forces, it will remain almost completely in its normal position. Inasmuch as the knife-edge support 5' is through lever arm 6 connected with housing body 1, the same knife-edge support will move together with the housing body so that adjusting screw 13 arranged in pendulum body 11 and occupying a relative rest position will move hook 3 beyond its dead center position and thus will initiate operation of the mechanism.

When the earth shock occurs in reverse direction, i.e. in the direction of the arrow B, not only will pendulum body 11 with its adjusting screw 13 and housing body 1 move in the direction of the arrow B, but also lever arm 6 with knife-edge support 5 thereon will move in the direction of the arrow B. In this connection, pendulum body 11 absorbs inertia energy. At the instant of the negative shock wave phase, i.e. when moving in the direction of the arrow A, the pendulum body 11 maintains its original movement and by means of its adjusting screw 13 presses hook 3 which moves in the direction of the arrow A, beyond its dead center position whereby the operation of the mechanism is initiated. The time at which this initiation occurs is thus displaced by the time of half a wave length.

Figure 2:
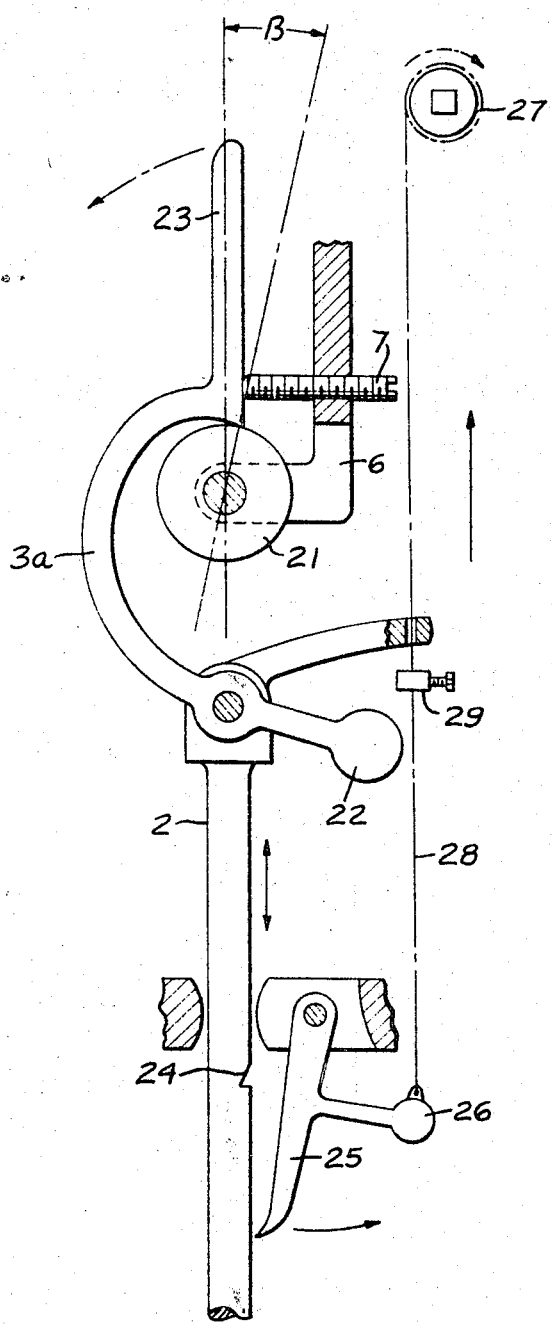
FIGURE 2 is a view similar to that of FIG. 1 with arresting and tensioning means, which shows only those elements which are important for the initiating steps, the initiating elment being somewhat modified over that of FIGURE 1.

According to the embodiment of FIG. 2, hook 3 of FIG. 1 is replaced by a hook 3a which rests on a roller 21 on lever arm 6 in contrast to hook 3 of FIG. 1 resting on elements 4, 5 and 5'. Hook 3a is provided with a counterweight 22 which sees to it that leg 23 of hook 3a will for its starting position move automatically beyond the dead center position. The hook effect is illustrated by the angle β. The release bar 2 has a notch 24 adapted to be engaged by an arresting pawl 25 with a counterweight 26. A driven roller 27 or similar stroke producing mechanism resets the release mechanism by causing a cable 28 to disengage arresting lever 25 from notch 24 while a dog 29 moves pull-rod 2 from its released position back into its set or tensioned position, and hook 3 again occupies its upper dead center position.

Figure 3:
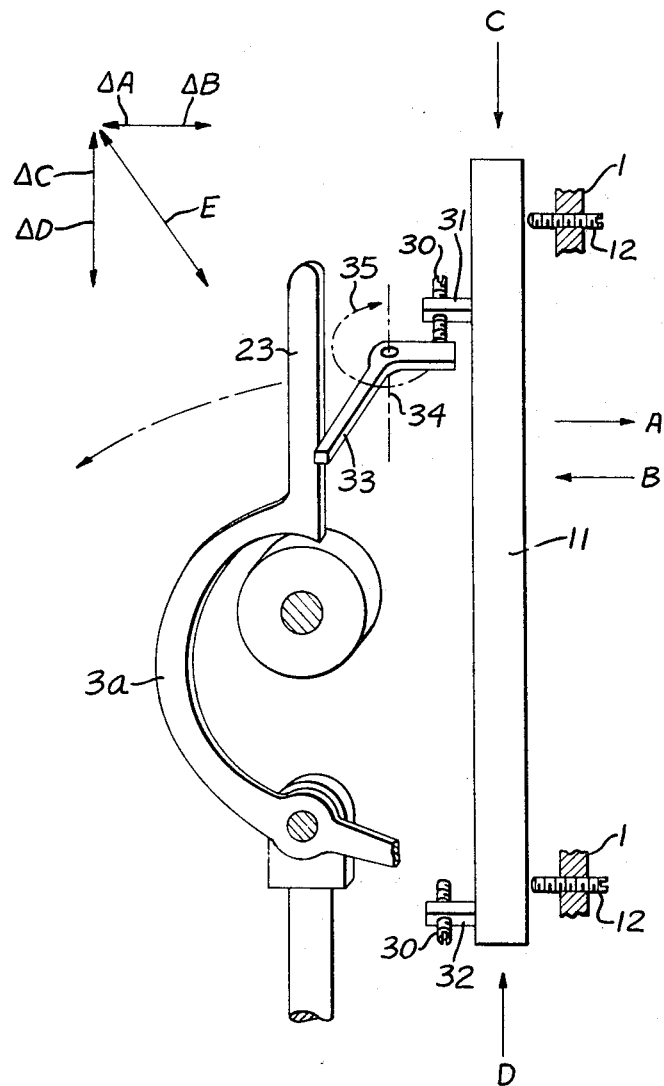
FIGURE 3 is an isometric representation of an arrangement according to the present invention with a modified pressure member.
Figure 5:
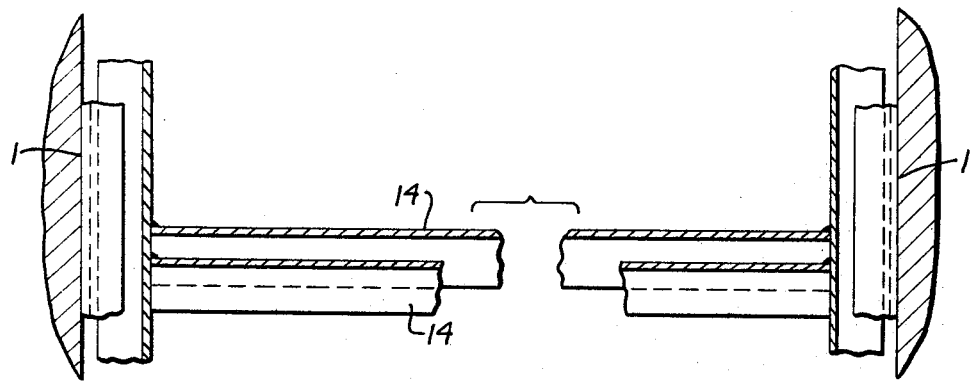
FIGURE 5 is a section taken along the line V—V of FIGURE 1.
Figure 6:
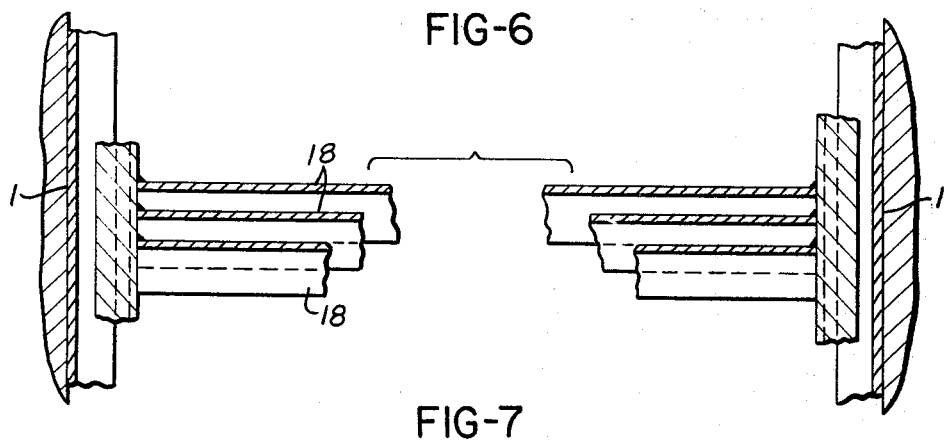
FIGURE 6 is a section taken along the line VI—VI of FIGURE 1.
Figure 7:
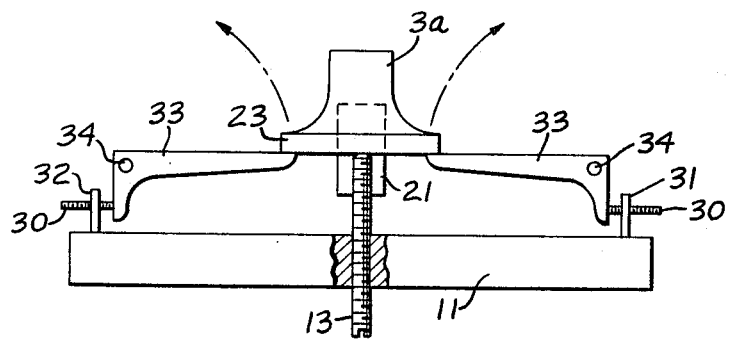
FIGURE 7 is a top view of releasing means for use in connection with the present invention.

According to the embodiment illustrated in FIG. 3, the pendulum body is shown partly in top view in order to facilitate understanding of the showing. In the horizontal plane there are provided adjusting screws 30 which threadedly engage and are passed through the supports 31, 32, said supports being rigidly connected to the pendulum body 11. An angle lever 33 is by means of a shaft 34 rotatably journalled in housing body 1 and is likewise movable along a horizontal plane. Adjusting screw 30 is screwed and adjusted against a leg of angle lever 33 in such a way that the other leg of said angle lever engages leg 23 of hook 3a without play.

When an earth shock occurs in the direction of the arrow D, housing body 1 and angle lever 33 with its shaft 34 connected to housing body 1 will be moved in the direction of the arrow D. Since pendulum body 11 remains in its original position, a rotative movement of angle lever 33 occurs in the direction of the arrow 35 which movement brings about initiation of the operation of the device. The arrangement furthermore comprises a non-illustrated angle lever arrangement which forms the image to the angle lever arrangement 33, 34 and is in power flow connection with the adjusting screw 30 in support 32.

If now an earth shock wave occurs in the direction of the arrow C, a release of the mechanism likewise occurs. If the earth shock wave occurs in the direction of the arrow E (FIG. 3) in negative or positive direction, the forces will be divided into components ΔA or ΔB, or ΔC or ΔD so that the release sensitivity will have approximately circular character inasmuch as all technical steps (FIGS. 1 and 3) are superimposed.

The air deviating grid 18a according to FIG. 4 is circularly conical and is adapted to deviate air shocks from any direction at the same sensitivity and to initiate operation of the mechanism.

In such instances in which the release mechanism has to be particularly sensitive it is advantageous that the pendulum body be as heavy as possible so that it to has already sufficient kinetic energy to push the relatively light release lever beyond the dead center point at low relative speeds and at small amplitudes and to thereby initiate the release. This is due to the fact that the heavy pendulum body itself does not have to make the movement of the relase lever.

A device according to the present invention greatly simplifies heretofore known release mechanisms and is adapted to be employed with pressure and suction effects and also with earth shocks. In addition thereto the device is simple in construction and practically resistant against disturbances, and therefore hardly needs any servicing.

It is, of course, to be understood that the present invention is by no means limited to the particular arrangement shown in the drawings, but also comprises any modifications within the scope of the appended claims. It is also to be noted that the invention is not limited to the particular field of application referred to above. Thus, an initiation of the operation of mechanisms may be effected such as the turning on and turning off of electric energy or the like.

What I claim is:

1. An apparatus for initiating safety measures under predetermined emergency condition as represented by shock or pressure waves comprising; a stationary support, an actuating member moveable in said support and having a set position and operable to initiate said safety measures when released from said set position, a release element of relatively small mass pivotally connected to said member for moving the member in said support into said set position and for releasing it therefrom, latch means on said support for engaging said element when said element is moved into reset position to locate said member in its said set position and operable to hold said element in said reset position, adjustable means on said support engaging said latch means when said element is in its said reset position and holding said element at the point of release from said latch means, a second element having a mass large with respect to that of said release element and supported in said support so as to have a normal position therein while being moveable therein in response to shock and pressure waves, and trip means carried by said second element and operatively engaging said release element whereby movement of said second element under emergency conditions as represented by shock or pressure waves will move said release element out of supporting engagement with said latch means and release said actuating member from its set position.

2. An apparatus according to claim 1 in which said trip means is adjustable to vary the amount of movement of said second element required to release said release element from said latch means.

3. An apparatus according to claim 1 in which said latch means comprises a link having knife edge engagement with said support and with said release element and resting in a slightly over center position when said release element is in its said reset position.

4. An apparatus according to claim 1 in which said second element is a pendulum like body and wherein a support member is provided for said second element having knife edge engagement with said support and with said second element.

5. An apparatus according to claim 4 in which a flexible diaphragm is supported adjacent said second element to transmit the force of pressure waves thereto.

6. An apparatus according to claim 1 in which said trip means includes angle lever means pivoted in said support and having one leg means thereof engaging said release element and the other leg means thereof positioned for actuating engagement by said second element upon movement thereof from its said normal position.

7. An apparatus according to claim 1 in which said latch means comprises a roller in said support and said release element has a hook portion to engage the periphery of the roller.

8. An apparatus according to claim 1 which includes a latch in the frame engageable with said actuating member when the latter is in its released position, a device connected to said latch to withdraw it from said actuating member when the latter is to be returned to its set position, means on the device for moving said actuating member back to its set position following the withdrawing of said latch, and counterweight means on said release element for automatically moving it into engagement with said latch means when said actuating member is moved into its said set position by said device.

References Cited

UNITED STATES PATENTS

| | | | |
|---|---|---|---|
| 1,261,924 | 4/1918 | Grasty et al. | 49—31 XR |
| 1,625,017 | 4/1927 | Birkholz | 340—262 XR |
| 1,720,694 | 7/1929 | Schlesinger | 137—73 XR |
| 1,817,567 | 8/1931 | Karelitz | 73—71 |
| 1,834,036 | 12/1931 | Simpson. | |
| 2,158,753 | 5/1939 | Hansen | 137—45 |

FOREIGN PATENTS

| | | |
|---|---|---|
| 646,028 | 11/1928 | France. |

JAMES J. GILL, *Primary Examiner.*